(No Model.)
G. B. N. DOW.
FILLER COLLAR.
No. 419,142. Patented Jan. 7, 1890.
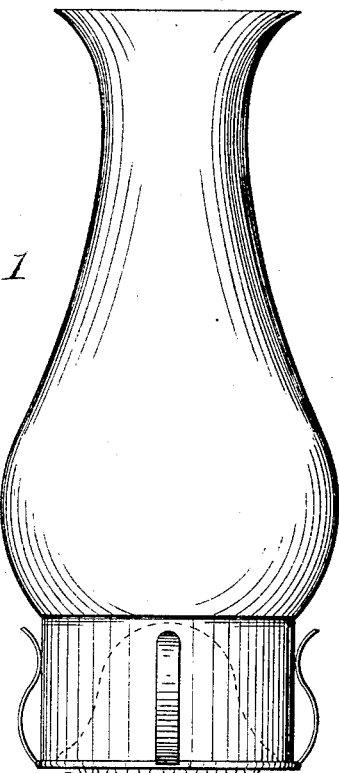
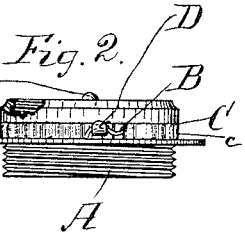
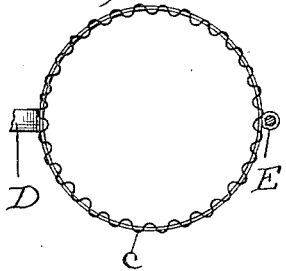
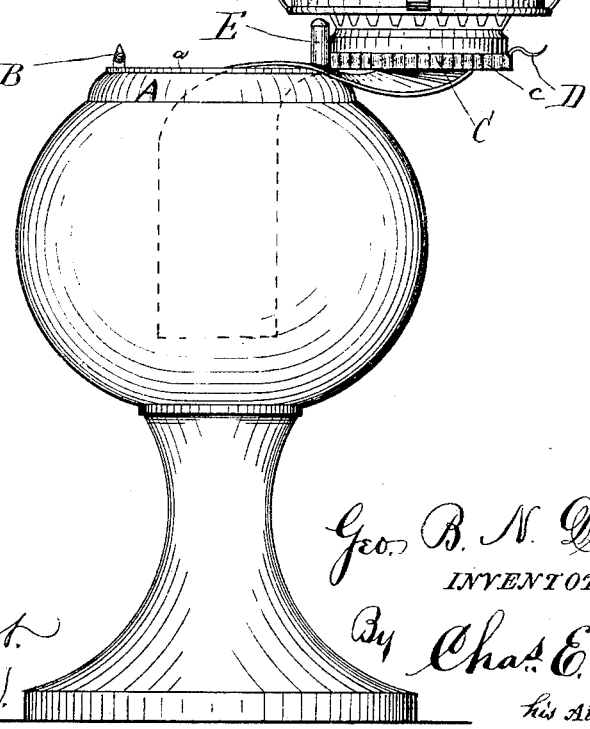
WITNESSES
Geo. B. N. Dow,
INVENTOR
By Chas. E. Barber,
his Attorney in fact.

UNITED STATES PATENT OFFICE.

GEORGE B. N. DOW, OF MANCHESTER, NEW HAMPSHIRE.

FILLER-COLLAR.

SPECIFICATION forming part of Letters Patent No. 419,142, dated January 7, 1890.

Application filed April 27, 1889. Serial No. 308,842. (No model.)

*To all whom it may concern:*

Be it known that I, GEORGE B. N. DOW, a citizen of the United States, residing at Manchester, in the county of Hillsborough, State of New Hampshire, have invented certain new and useful Improvements in Filler-Collars, of which the following is a full, clear, and exact description, such as will enable others skilled in the art to which my invention appertains to make and use the same, reference being had to the accompanying drawings, in which—

Figure 1 is a side elevation of a lamp and burner provided with my improved collar. Fig. 2 is a side elevation of the collar and base-ring detached. Fig. 3 is a view looking through the collar and showing the corrugations on the lower periphery of the collar extending into the opening in the base-ring.

The object of my invention is to provide a filler-collar by the use of which those unpleasantnesses and inconveniences incident to the filling of a lamp shall be entirely avoided.

Another object of my invention is to provide a collar that may be easily and comfortably operated by any person with the least discomfort and in the shortest possible time, with the least inconvenience and danger, and the least expense of physical force.

In the accompanying drawings, A designates the base-ring of any ordinary lamp, which ring is rigidly secured to the main portion or bowl of the lamp. This base-ring A is provided with a catch B, which extends up and then back horizontally on a line approximately in the plane of the top of the base-ring A. Pivotally secured to this base-ring A is a collar C, to which is secured a corresponding thumb-catch D, of spring metal. The lower periphery of this collar C is formed with a series of corrugations c, which extend on both sides of the inner rim a of the base-ring A, which is secured to the lower portion of the collar C, and is adapted to engage with the catch B on the base-ring A. The base-ring may be screw-threaded, so as to screw into a collar on the lamp-bowl.

The base-ring A is provided with a pivotal pin E, which extends vertically up from the ring, and to which is pivotally secured the collar C, which is adapted to rotate on this pin in a horizontal plane. It will be seen at a glance that this construction will enable the operator to release the catches and turn the collar C and chimney and burner to one side without removing either of them from the collar. By this means the lamp may be easily and quickly filled without the necessity of laying the lamp chimney and burner down, thus obviating the disagreeable spilling of kerosene or other fluid and producing the offensive odor in the room which is generally produced by laying the burner down while filling the lamp. Again, the wick will serve to keep the collar from moving around too far, and it will also insure its own retention within the reservoir of the lamp, thus avoiding the spilling of the fluid.

The fluting on the lower periphery of the collar will give it a certain amount of pliability, and will also serve, by reason of its extending into the opening within the base-ring A, as a medium of ventilation or an avenue of escape for the accumulated gas in the reservoir.

I do not wish to be understood as limiting myself to the exact construction shown and described, as it may be varied in some of its details without departing from the spirit of my invention and without materially interfering with its usefulness.

Having described the objects, uses, and advantages of my device, what I desire to secure by Letters Patent, and what I therefore claim, is—

1. In a filler-collar, a base-ring, in combination with a collar pivoted thereon, the said collar having its lower periphery provided with a series of corrugations, substantially as shown and described and set forth.

2. A base-ring having a catch extending vertically and horizontally therefrom, in combination with a collar pivoted on said base-ring, and provided with a series of corrugations extending across the edges of the opening in said ring, for the purpose set forth, and a spring-catch on said collar adapted to engage the catch on the base-ring, all substantially as shown and described.

3. In a filler-collar, a base-ring having a pivot-pin extending at a right angle to the line of the top of said ring, and also having a catch extending from it, the said catch having a curved upper portion, in combination with a collar provided with a loop for engagement with said pivot-pin, and with a series of corrugations extending across the edge of the opening in said base-ring, and a spring-catch on said collar adapted to engage the catch on the base-ring, all substantially as shown, and for the purposes set forth.

In testimony whereof I affix my signature in the presence of two witnesses.

GEORGE B. N. DOW.

Witnesses:
  JESSE B. PATTEE,
  JOHN C. BICKFORD.